United States Patent
Xie

(10) Patent No.: US 8,198,369 B2
(45) Date of Patent: *Jun. 12, 2012

(54) SHAPE MEMORY POLYMERS WITH SURFACE HAVING DANGLING ADHESIVE POLYMERIC CHAINS AND METHODS OF MAKING AND USING THE SAME

(75) Inventor: Tao Xie, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 463 days.

This patent is subject to a terminal disclaimer.

(21) Appl. No.: 12/432,211

(22) Filed: Apr. 29, 2009

(65) Prior Publication Data

US 2010/0035049 A1 Feb. 11, 2010

Related U.S. Application Data

(60) Provisional application No. 61/086,222, filed on Aug. 5, 2008.

(51) Int. Cl.
- *C08L 27/06* (2006.01)
- *C08L 29/04* (2006.01)
- *C08L 31/04* (2006.01)
- *C08L 63/00* (2006.01)
- *C08L 71/12* (2006.01)

(52) U.S. Cl. .......... 525/113; 521/178; 525/58; 525/396; 525/524

(58) Field of Classification Search .................. None
See application file for complete search history.

(56) References Cited

U.S. PATENT DOCUMENTS

| | | | |
|---|---|---|---|
| 5,755,913 | A | 5/1998 | Liaw et al. |
| 6,160,084 | A | 12/2000 | Langer et al. |
| 6,759,481 | B2 | 7/2004 | Tong |
| 6,773,535 | B1 | 8/2004 | Wetzel |
| 6,827,325 | B2 | 12/2004 | Hofmann et al. |
| 6,986,855 | B1 | 1/2006 | Hood et al. |
| 7,188,498 | B2 | 3/2007 | Browne et al. |
| 2001/0047579 | A1 | 12/2001 | Lee et al. |
| 2005/0151385 | A1 | 7/2005 | Autumn et al. |
| 2005/0167556 | A1 | 8/2005 | Fontana et al. |
| 2005/0240190 | A1 | 10/2005 | Gall et al. |
| 2005/0274455 | A1 | 12/2005 | Extrand |
| 2006/0036045 | A1 | 2/2006 | Wilson et al. |
| 2006/0156535 | A1 | 7/2006 | Browne et al. |
| 2007/0073130 | A1 | 3/2007 | Finch et al. |
| 2007/0289786 | A1 | 12/2007 | Cutkosky et al. |
| 2009/0280330 | A1 * | 11/2009 | Xie et al. ................ 428/413 |
| 2010/0022710 | A1 * | 1/2010 | Xie et al. ................ 525/63 |
| 2010/0221523 | A1 * | 9/2010 | Hood et al. .............. 428/318.4 |

FOREIGN PATENT DOCUMENTS

EP 0409580 1/1991

OTHER PUBLICATIONS

Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.
Epon Resin 828 Structural Reference Manual, Shell Chemicals, Houston, TX 2009.
Gall et al., Shape Memory Polymer Nanocomposites, Acta Materialia, 2002, pp. 5115-5126, vol. 50.
Gall et al., Internal Stress Storage in Shape Memory Polymer Nanocomposites, Applied Physics Letter, Jul. 12, 2004, pp. 290-292, vol. 85, No. 2.
Xu et al., Synthesis and Shape Memory Effects of Si-O-Si Cross-Linked Hybrid Polyurethanes, Polymer, 2006, pp. 457-465, vol. 47.
Crystallisation of Liquid DGEBPA and DGEBPF Epoxy Resins, Resolution Performance Products, Product Bulletin, SC:2365-01, Jul. 2001.
Jeffamine D-230 Polyetheramine, Technical Bulletin, Huntsman Corporation, Copyright 2006.
Xie et al., Self-Peeling Reversible Dry Adhesive System, Materials, & Processes Laboratory, General Motors Research & Development Center, Chem. Mater. 2008, vol. 20, pp. 2866-2.
Aubert et al., Thermally Removable Epoxy Adhesives Incorporating Thermally Reversible Diels-Alder Adducts, The Journal of Adhesion, 2003, vol. 79, pp. 609-616.
International Search Report and Written Opinion, International Application No. PCT/US/2008/060796 Filed Apr. 18, 2008, Appicant GM Global Technology Operations, Inc. Unver et al., Geckbot: A Gecko Inspired Climbing Robot Using Elastomer Adhesives, 2009.
Daltorio et al., A Small Wall-Walking Robot with Compliant, Adhesive, Feet, IEEE/RSJ International Conference on Intelligent Robots and Systems, 2005, pp. 4018-4023.
International Search Report and Written Opinon, International Application No. PCT/US2008/060826 filed Apr. 18, 2008, Applicant GM Global Technology Operations, Inc.
Lee et al., A Reversible Wet/Dry Adhesive Inspired by Mussels and Geckos, Nature, Jul. 19, 2007, pp. 338-342, vol. 448.
Lee et al., Single-Molecule Mechanics of Mussel Adhesion, PNAS, Aug. 29, 2005, pp. 12999-13-3, vol. 103, No. 35.
Veriflex Shape Memory Polymer, http://www.crgrp.net/veriflex.shtml, Cornerstone Research Group, Inc., 2003-2007.
Shape Memory Polymer, http://crgnp.net/success-stories.shtml, Cornerstone Research Group, Inc., 2003-2007.
TEMBO Shape Memory Polymers and Elastic Memory Composite (EMC) Material, http://www.ctd-materials.com/products/emc.htm, Cornerstone Research Group, Inc., 2003-2007.

(Continued)

*Primary Examiner* — Robert Sellers
(74) *Attorney, Agent, or Firm* — BrooksGroup

(57) ABSTRACT

One exemplary embodiment of the invention includes grafting a thermoplastic hot melt adhesive material to a shape memory polymer surface.

10 Claims, 1 Drawing Sheet

OTHER PUBLICATIONS

Behl et al., Shape-Memory Polymers: Dual Shape Materials for Bio-medical Applications, A. Mater. Today, 2007, vol. 10, pp. 1-20.
Bellin et al., Polymeric Triple-Shape Materials, PNAS, Nov. 28, 2006, vol. 103, No. 48, pp. 18043-18047.
Chung et al., Two-Way Reversible Shape Memory in a Semicrystalline Network, Macromolecules, 2008, vol. 41, pp. 184-192.
Rousseau et al., Shape Memory Effect Exhibited by Smectic-C Liquid Crystalline Elastomers, J. Am. Chem. Soc., 2003, vol. 125, pp. 15300-15301.
Liu et al., Review of Progress in Shape-Memory Polymers, Journal of Materials Chemistry, 2007, vol. 17, pp. 1543-1558.
Dietsch et al., A Review—Features and Benefits of Shape Memory Polymers (SMPs), Journal of Advanced Materials, Apr. 2007, vol. 39, No. 2, pp. 3-12.
Li et al., Shape Memory Effect of Ethylene—Vinyl Acetate Copolymers, Journal of Applied Polymer Science, 1999, vol. 71, pp. 1063-1070.
Liu et al., Novel Shape-Memory Polymer with Two Transition Temperatures, Macromol. Rapid Commun., 2005, vol. 26, pp. 649-652.
Reyntjens et al., Polymer Networks Containign Crystallizable Poly(octadecyl vinyl ether) Segments for Shape-Memory Materials, Macromol. Rapid Commun., 1999, vol. 20, pp. 251-255.
Jiang et al., Polymers Move in Response to Light, Advanced Materials., 2006, vol. 18, pp. 1471-1475.
Huang et al., Water-Driven Programmable Polyurethane Shape Memory Polymer: Demonstration and Mechanism, Applied Physical Letters, 2005, vol. 86, pp. 114105-1-3.
Lendlein et al., Light-Induced Shape-Memory Polymers, Nature, Apr. 14, 2005, vol. 434, pp. 879-882.
Goethals et al., Poly(vinyl ethers) as Building Blocks for New Materials, Macromol. Symp. 1998, vol. 132, pp. 57-64.
Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.
Xie, U.S. Appl. No. 12/178,844, High Strength Reversible Noncovalent Adhesion Methods for a Solid Polymer-Polymer Interface, filed Jul. 24, 2008.
Cheng, U.S. Appl. No. 12/359,709, Remote Activation of Thermo-Reversible Dry Adhesives, filed Jan. 26, 2009.
Xie, U.S. Appl. No. 12/423,947, Shape Memory Polymer and Adhesive Combination and Methods of Making and Using the Same, filed Apr. 15, 2009.
Xie, U.S. Appl. No. 12/432,211, Shape Memor Polymers with Surface Having Dangling Adhesive Polymeric Chains and Methods of Making and Using the Same, filed Apr. 29, 2009.
Xie, U.S. Appl. No. 12/181,562, Polymer Systems with Multiple Shape Memory Effect, filed Jul. 29, 2008.
Xie, U.S. Appl. No. 11/867,549, Method of Miniimizing Residue Adhesion for Thermo-Reversible Dry Adhesives, filed Oct. 4, 2007.
Xie, U.S. Appl. No. 12/105,865, Attachment Pad with Thermal Reversible Adhesive and Methods of Making and Using the Same, filed Apr. 18, 2008.
Xie, U.S. Appl. No. 11/867,558, Multilayer Adhesive for Thermal Reversible Joining of Substrates, filed Oct. 4, 2007.
Xie, U.S. Appl. No. 12/391,704, Reversible Dry Adhesives for Wet adn Dry Conditions, filed Feb. 24, 2009.
Xie, U.S. Appl. No. 12/105,749, Method for Robotic Handling Using Thermo-Reversible Dry Adhesives, filed Apr. 18, 2008.
Xie, U.S. Appl. No. 12/105,788, Climbing Devices Based on Thermo-Reversible Dry Adhesives, filed Apr. 18, 2008.
Ingo Bellin et al, Dual-Shape Properties of Triple-Shape Polymer Networks with Crystallizable Network Segments and Grafted Side Chains, The Royal Society of Chemistry 2007, Jun. 12, 2007, pp. 2885-2891.

* cited by examiner

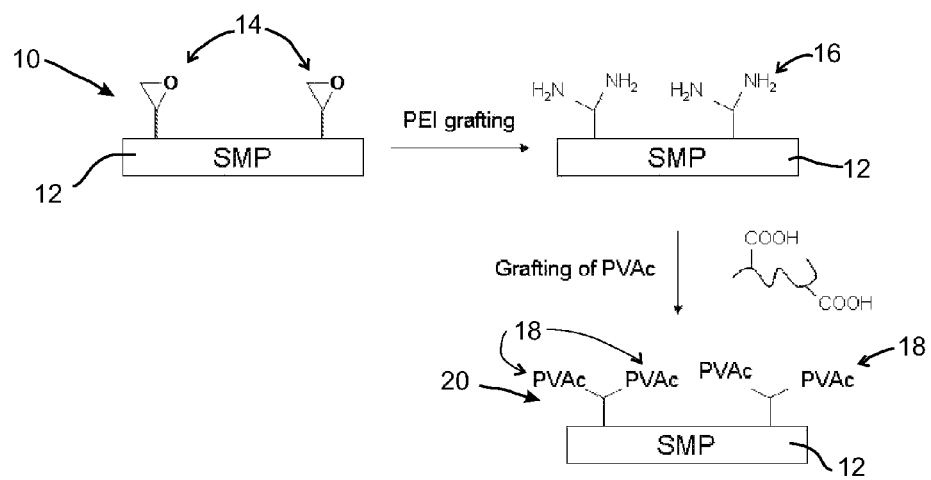

US 8,198,369 B2

SHAPE MEMORY POLYMERS WITH SURFACE HAVING DANGLING ADHESIVE POLYMERIC CHAINS AND METHODS OF MAKING AND USING THE SAME

This application claims the benefit of U.S. Provisional Application Ser. No. 61/086,222 filed Aug. 5, 2008.

TECHNICAL FIELD

The field to which the disclosure generally relates to includes shape memory polymers and adhesives.

BACKGROUND

Heretofore it has been known to provide a shape memory polymer and to apply a hot melt adhesive thereto with a liquid dispensing system which may add cost and complication to the bonding process.

SUMMARY OF EXEMPLARY EMBODIMENTS OF THE INVENTION

One embodiment includes a product including a shape memory polymer having a surface having polymeric chains dangling therefrom so that the shape memory polymer may be capable of adhering to a substrate or selective adhered to a substrate.

One exemplary embodiment of the invention includes grafting a thermoplastic hot melt adhesive material to a shape memory polymer surface.

Another exemplary embodiment of the invention includes a method of providing a combination including a shape memory polymer layer and an adhesive polymer grafted to the shape memory polymer layer, and heating the combination above the thermal transition temperatures of the shape memory polymer layer and the grafted adhesive polymer, and pressing the adhesive polymer against a substrate and cooling the adhesive polymer while under load to bond the adhesive polymer to the substrate.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1 illustrates a method of making a product including a shape memory polymer layer having an adhesive polymer grafted to a surface of the shape memory polymer layer.

DETAILED DESCRIPTION OF EXEMPLARY EMBODIMENTS

The following description of the embodiment(s) is merely exemplary (illustrative) in nature and is in no way intended to limit the invention, its application, or uses.

One exemplary embodiment includes providing a shape memory polymer including unreacted groups on the surface thereof. In one embodiment, an adhesive polymer is grafted directly to the unreacted groups on the surface of the shape memory polymer layer. In another embodiment, an intermediate group is grafted to the unreacted groups on the shape memory polymer layer and thereafter an adhesive polymer is grafted to the shape memory polymer surface by a reaction between groups of the intermediate grafting material and the adhesive polymer.

In one embodiment, epoxy-based shape memory polymer is provided including unreacted surface epoxy groups. Polyethylenimine (PEI) containing many amine groups is grafted onto the epoxy shape memory polymer surface via the reaction between the epoxy groups on the surface and the amines of the PEI. Thereafter, the PEI grafted epoxy shape memory polymer may be soaked in a solution including poly(vinyl acetate) (PVAc) with carboxylic acid groups. The reaction between amines on the PEI and the carboxylic acid groups on the PVAc lead to the grafting. The reaction is illustrated in FIG. 1. It should be pointed out with respect to FIG. 1, that both exposed surfaces of the shape memory polymer including the bottom and sides, will be grafted with PVAc, which is a typical hot melt thermoplastic adhesive (glue). Other types of shape memory polymers, other thermoplastic hot melt adhesives (glues), and different grafting chemistries may be used. In addition, thermoplastic hot melt adhesives (glues) can be cross-linked to become shape memory polymers themselves with free dangling chains on the surface to serve as adhesives (glues). The shape memory polymer may be a solid or a foam as will be described hereafter. The adhesive may be grafted onto the shape memory polymer as a single monomolecular layer or multiple layers of the adhesive, for example, but not limited to, 2 to 10 molecular layers thick, may be grafted on to the shape memory polymer.

The combination of the shape memory polymer layer with grafted adhesive polymer thereto may be utilized to reversibly adhere the shape memory polymer to a substrate using the grafted adhesive polymer. One embodiment includes a method including heating the adhesive grafted shape memory polymer to a temperature above the thermal transition temperatures of both the shape memory polymer and the adhesive polymer, pressing the heated adhesive polymer against a substrate, and cooling down the adhesive polymer under pressure (load) to below both the thermal transition temperatures of the shape memory polymer layer and the adhesive to bond the shape memory polymer layer to the substrate via the grafted adhesive polymer. The bonding speed may be determined by the time it takes to cool down the adhesive polymer to below the thermal transition temperatures of the shape memory polymer and the adhesive polymer. Select illustrative chemistries, but not limiting, are provided below for the shape memory polymer and the adhesive polymer.

The following description is of select shape memory polymers and adhesives for grafting thereto. For a polymer to possess shape memory properties, it has to have a frozen phase and a reversible phase. The former is responsible for memorizing the original shape and is usually achieved via chemical cross-linking or physical cross-linking (e.g., chain entanglement and crystallization). The fixing and change of temporary shapes, on the other hand, are due to the reversible phase, which can be either a glass transition or a melting transition. Since most polymers possess a glass transition temperature ($T_g$) or a melting temperature ($T_m$) or both, they can be converted into shape memory polymers by introducing a freezing mechanism (e.g. chemical cross-linking). The ample opportunities to create and tailor the shape memory properties of shape memory polymers through molecular design are exemplified by the variety of shape memory polymers discovered and the wide range of $T_g$ (from −30 to +70° C.) obtainable with polyurethane shape memory polymers.

One embodiment includes a multilayer adhesive system capable of reversible joining of two substrates having a pull-off adhesion force at temperatures below the thermal transition temperatures of the shape memory polymer and adhesive polymer substantially higher than a peeling-off force for dejoining or unjoining or decoupling at temperatures above the thermal transition temperatures of the shape memory polymer and adhesive polymer.

Numerous shape memory polymers may be utilized in various embodiments of the invention. For example, starting with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 3° C. to 90° C. As such, a shape memory polymer may be tailored for use with an adhesive as desired for a particular application operated within certain temperature ranges. As such, the adhesive layer may have a $T_g$ ranging from −90° C. to 200° C., and the shape memory polymer may have a $T_g$ ranging from 25° C. to 200° C.

Some embodiments refer to a multilayer epoxy adhesive. It should be understood that more than two layers may be utilized. For example, there may be two or more layers of the shape memory polymer layer, which may be in a side by side relationship or an overlying relationship. Likewise, there may be two or more adhesive layers in a side by side relationship or an overlying relationship. As such, a device with custom or tailored properties may be manufactured.

In various embodiments, the adhesive layers may be an epoxy thermoplastic adhesive or a phenoxy adhesive. In various embodiments, the shape memory polymer may be an epoxy. In various embodiments of the invention, any combination of a shape memory polymer and an adhesive may be utilized. The following examples of shape memory polymers and adhesives are for illustrative purposes only.

In various embodiments, the components of the adhesive or the components of the shape memory polymer may include a rigid epoxy and a flexible epoxy. The range of possible crosslinking chemistries which may be used to achieve an adhesive or shape memory polymer may include alpha, omega-diaminoalkanes, monoamines, organic multi-carboxylic acids, anhydrides, or catalytic (as in imidazole type) crosslinking reagents. There are many different ways to achieve the appropriate relationships between the molecular properties. For example, the adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one embodiment, the components of the adhesive may be present in an amount sufficient to provide, upon curing of the composition, a thermoplastic adhesive having a glass transition temperature of −90° C. to 200° C. and having an adhesive tensile strength of 1-4000 N/cm$^2$ from a substrate. In one embodiment, the components of the shape memory polymer composition may be present in an amount sufficient to provide, upon curing of the composition, an epoxy shape memory polymer having a change in storage modulus of 2 to 3 orders of magnitude before and after its glass transition.

Numerous shaped memory polymers may be utilized in various embodiments of the invention. For example, staring with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 3° C. to 90° C. As such, a shape memory polymer may be tailored for use with a dry adhesive as desired for a particular application operated within certain temperature ranges.

In another embodiment, a shape memory polymer may be made from copolymers of ethylene and vinyl acetate (EVA) which are typical hot melt glues. The EVA polymers may be chemically crosslinked polymers via e-beam radiation gamma-ray radiation, or organic peroxides. The crosslinked polymer becomes a shape memory polymer with dangling EVA chains on the surface.

In another embodiment, a hot melt glue polymer is chemically crosslinked to become a shape memory polymer with dangling hot melt glue polymer chains on the surface. The hot melt glue chains may include, but are not limited to, one or more of EVA, phenoxy, polyvinyl chloride, polyamide, polyester, polyacetate or polyacetal polymers or copolymers thereof.

The above description of embodiments of the invention is merely exemplary in nature and, thus, variations thereof are not to be regarded as a departure from the spirit and scope of the invention.

What is claimed is:

1. A method comprising:
providing a shape memory polymer layer and grafting an adhesive polymer to the shape memory polymer layer; and
grafting an intermediate material to the shape memory polymer layer prior to grafting the adhesive.

2. A method as set forth in claim 1 wherein the shape memory polymer layer comprises an epoxy polymer.

3. A method as set forth in claim 1 wherein the adhesive comprises poly(vinyl acetate) or its copolymers.

4. A method as set forth in claim 1 wherein the adhesive comprises poly(vinyl alcohol) or its copolymers.

5. A method as set forth in claim 1 wherein the adhesive comprises a phenoxy polymer.

6. A method as set forth in claim 1 wherein the adhesive comprises a thermoplastic epoxy polymer.

7. A method as set forth in claim 1 wherein the adhesive comprises poly(vinyl chloride) or its copolymers.

8. A method comprising:
providing a shape memory polymer layer and grafting an adhesive polymer to the shape memory polymer layer; and
grafting an intermediate material to the shape memory polymer layer prior to grafting the adhesive; wherein the intermediate comprises polyethylenimine.

9. A method as set forth in claim 1 wherein the shape memory polymer layer is a foam.

10. A method comprising:
providing an epoxy shape memory polymer layer including unreacted epoxy groups on a surface thereof, grafting polyethylenimine including a plurality of amine groups onto the epoxy shape memory polymer layer surface via the reaction between the epoxy groups of the shape memory polymer layer and the amines of the polyethylenimine, and thereafter grafting poly (vinyl acetate) with carboxylic acid groups to the shape memory polymer layer by the reaction between amines of the polyethylenimine and the carboxylic acid groups of the poly(vinyl acetate).

* * * * *